(12) United States Patent
Bortoli et al.

(10) Patent No.: US 10,829,240 B2
(45) Date of Patent: Nov. 10, 2020

(54) CROSS ROD FOR TOGGLE MECHANISM OF RAM AIR TURBINE ACTUATOR

(71) Applicant: HAMILTON SUNDSTRAND CORPORATION, Windsor Locks, CT (US)

(72) Inventors: Stephen Michael Bortoli, Roscoe, IL (US); Paul Henry Verstrate, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1280 days.

(21) Appl. No.: 15/068,103

(22) Filed: Mar. 11, 2016

(65) Prior Publication Data
US 2017/0259934 A1 Sep. 14, 2017

(51) Int. Cl.
*F16C 7/02* (2006.01)
*B64D 41/00* (2006.01)
*F16C 7/06* (2006.01)
*F16C 5/00* (2006.01)
*F16C 11/04* (2006.01)
*F02C 7/32* (2006.01)

(52) U.S. Cl.
CPC .............. *B64D 41/007* (2013.01); *F02C 7/32* (2013.01); *F16C 5/00* (2013.01); *F16C 7/02* (2013.01); *F16C 7/06* (2013.01); *F16C 11/045* (2013.01); *F05D 2220/34* (2013.01); *F05D 2230/60* (2013.01); *F16C 2326/43* (2013.01)

(58) Field of Classification Search
CPC .......... F05D 2220/34; F16C 7/02; F16C 7/06; F16C 5/00
See application file for complete search history.

(56) References Cited

U.S. PATENT DOCUMENTS

| 9,821,919 | B2 * | 11/2017 | Bortoli | B64D 41/007 |
| 2016/0312865 | A1 * | 10/2016 | Prokup | F16H 21/06 |
| 2017/0259934 | A1 * | 9/2017 | Bortoli | B64D 41/007 |
| 2017/0260906 | A1 * | 9/2017 | Bortoli | B64D 41/007 |

* cited by examiner

*Primary Examiner* — Daniel J Wiley
(74) *Attorney, Agent, or Firm* — Cantor Colburn LLP (57) ABSTRACT

A cross rod for use in a toggle mechanism including a first section, a second section and a midsection between the first section and the second section. The midsection includes a flange having a through hole. The first section has a first diameter, the second section has a second diameter, and the midsection has a third diameter. The third diameter being larger than at least one of the first diameter and the second diameter.

14 Claims, 8 Drawing Sheets

CROSS ROD FOR TOGGLE MECHANISM OF RAM AIR TURBINE ACTUATOR

BACKGROUND

The subject matter disclosed herein generally relates to ram air turbine actuators, and more specifically to cross rods for use in a toggle mechanism of a ram air turbine (RAT) actuator.

RATs are commonly used on modern aircraft to provide a secondary and/or emergency power source in the event the primary power source is insufficient or fails. A typical RAT includes a turbine that remains internal to the aircraft until needed. When additional power is required, a door in the aircraft's fuselage will open and the actuator will deploy the RAT's turbine into the freestream air. The turbine is rotated by the freestream air and the rotational torque from the turbine is transferred through a drivetrain to be converted into electrical power by a generator. A RAT may also be used to drive a hydraulic pump.

A toggle mechanism internal to a RAT actuator may act as an over center mechanism to initiate the actuation process. After receiving an electrical command, solenoids pull on a cross rod in order to move the toggle mechanism past its over center position, which then allows the actuator to actuate and deploy the RAT. The cross rod experiences loading from the solenoids and also back loading from internal components of the actuator. Accordingly, a cross rod capable of withstanding the loading, while being easy to install and maintain would provide both cost and reliability benefits.

SUMMARY

According to one embodiment, a cross rod for use in a toggle mechanism of a ram air turbine actuator is provided. The cross rod includes a first section, a second section and a midsection between the first section and the second section. The midsection includes a flange having a through hole. The first section has a first diameter, the second section has a second diameter, and the midsection has a third diameter. The third diameter being larger than at least one of the first diameter and the second diameter.

In addition to one or more of the features described above, or as an alternative, further embodiments of the cross rod may include that the midsection includes a clearance notch.

According to another embodiment, a toggle mechanism of a ram air turbine actuator is provided. The toggle mechanism including a clevis and a cross rod operably connected to the clevis. The cross rod having a first section, a second section, and a midsection between the first section and the second section. The midsection includes a flange having a through hole. The toggle mechanism also includes a cap screw located in the through hole. The cap screw securing the cross rod to the clevis.

In addition to one or more of the features described above, or as an alternative, further embodiments of the toggle mechanism may include that the first section has a first diameter, the second section has a second diameter, and the midsection has a third diameter. The third diameter being larger than at least one of the first diameter and the second diameter.

In addition to one or more of the features described above, or as an alternative, further embodiments of the toggle mechanism may include that the midsection includes a clearance notch.

In addition to one or more of the features described above, or as an alternative, further embodiments of the toggle mechanism may include that the clevis includes a first set of parallel pivot holes, a second set of parallel pivot holes, a set of parallel through holes, and a helicoil blind hole.

In addition to one or more of the features described above, or as an alternative, further embodiments of the toggle mechanism may include a lock piston operably connected to the clevis through a link, the link being operably connected to the first set of parallel pivot holes via a pivot pin, wherein the pivot pin is secured in the first set of parallel pivot holes by the flange.

In addition to one or more of the features described above, or as an alternative, further embodiments of the toggle mechanism may include a bracket operably connected to the clevis at the second set of parallel pivot holes, via a biasing mechanism.

In addition to one or more of the features described above, or as an alternative, further embodiments of the toggle mechanism may include that the cap screw secures the cross rod to the clevis via the helicoil blind hole.

According to another embodiment, a method of manufacturing a toggle mechanism of a ram air turbine actuator is provided. The method includes forming a cross rod having a first section, a second section, and a midsection between the first section and the second section. The method also includes forming a flange at the midsection, the flange having a through hole. The method also includes inserting the cross rod into a set of parallel through holes within a clevis, such that the flange is abutting a side of the clevis. The method also includes installing a cap screw in the through hole of the flange to secure the cross rod to the clevis.

In addition to one or more of the features described above, or as an alternative, further embodiments of the method may include that the clevis includes a first set of parallel pivot holes, a second set of parallel pivot holes, and a helicoil blind hole.

In addition to one or more of the features described above, or as an alternative, further embodiments of the method may include operably connecting a lock piston to the clevis through a link, the link being operably connected to the first set of parallel pivot holes via a pivot pin, wherein the pivot pin is secured in the first set of parallel pivot holes by the flange.

In addition to one or more of the features described above, or as an alternative, further embodiments of the method may include operably connecting a bracket to the clevis at the second set of parallel pivot holes, via a biasing mechanism.

In addition to one or more of the features described above, or as an alternative, further embodiments of the method may include that the cap screw secures the cross rod to the clevis via the helicoil blind hole.

In addition to one or more of the features described above, or as an alternative, further embodiments of the method may include that the midsection includes a clearance notch.

In addition to one or more of the features described above, or as an alternative, further embodiments of the method may include forming the flange via machining the midsection of the cross rod.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
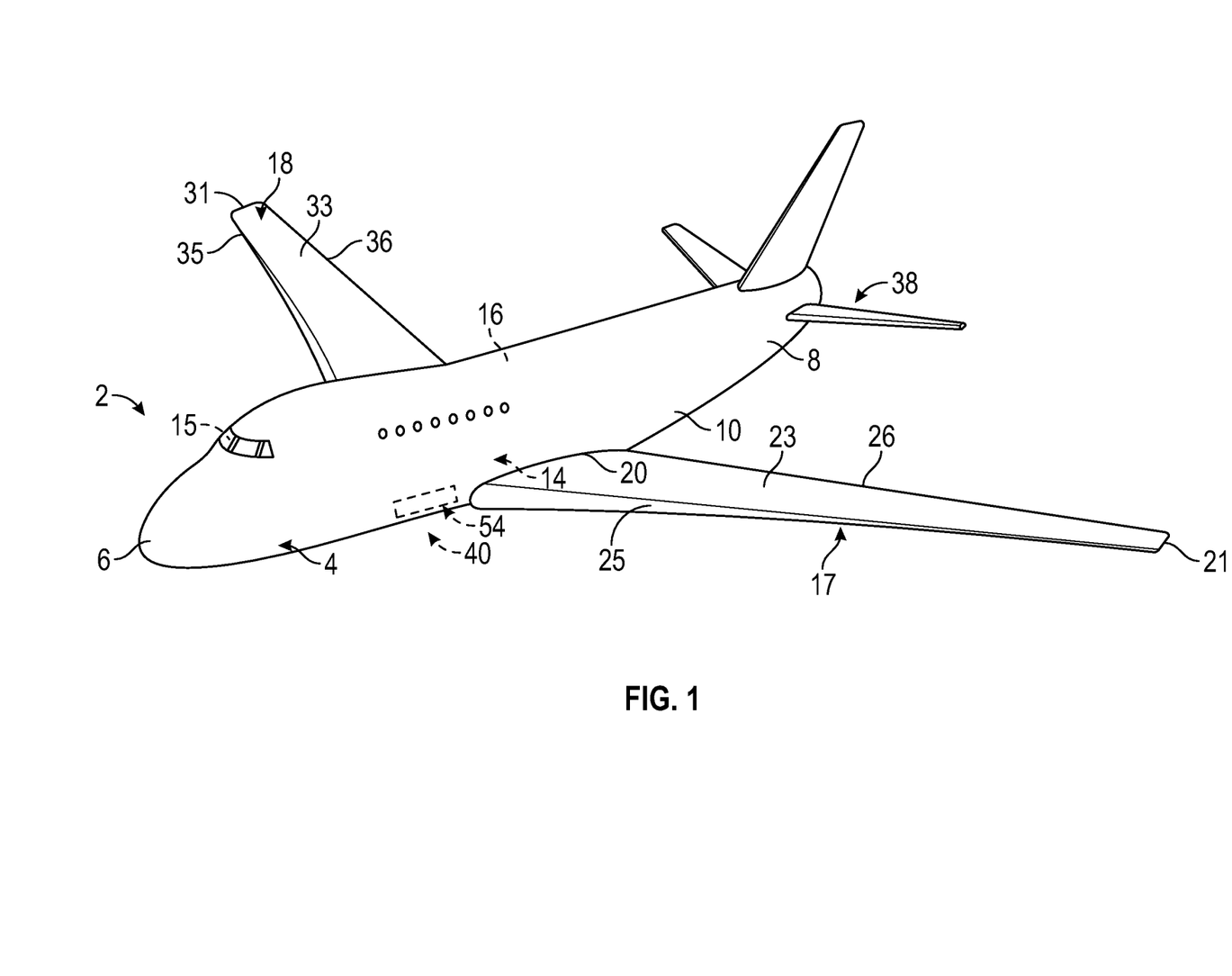
FIG. 1 is a perspective view of an aircraft that may incorporate embodiments of the present disclosure.
Figure 2:
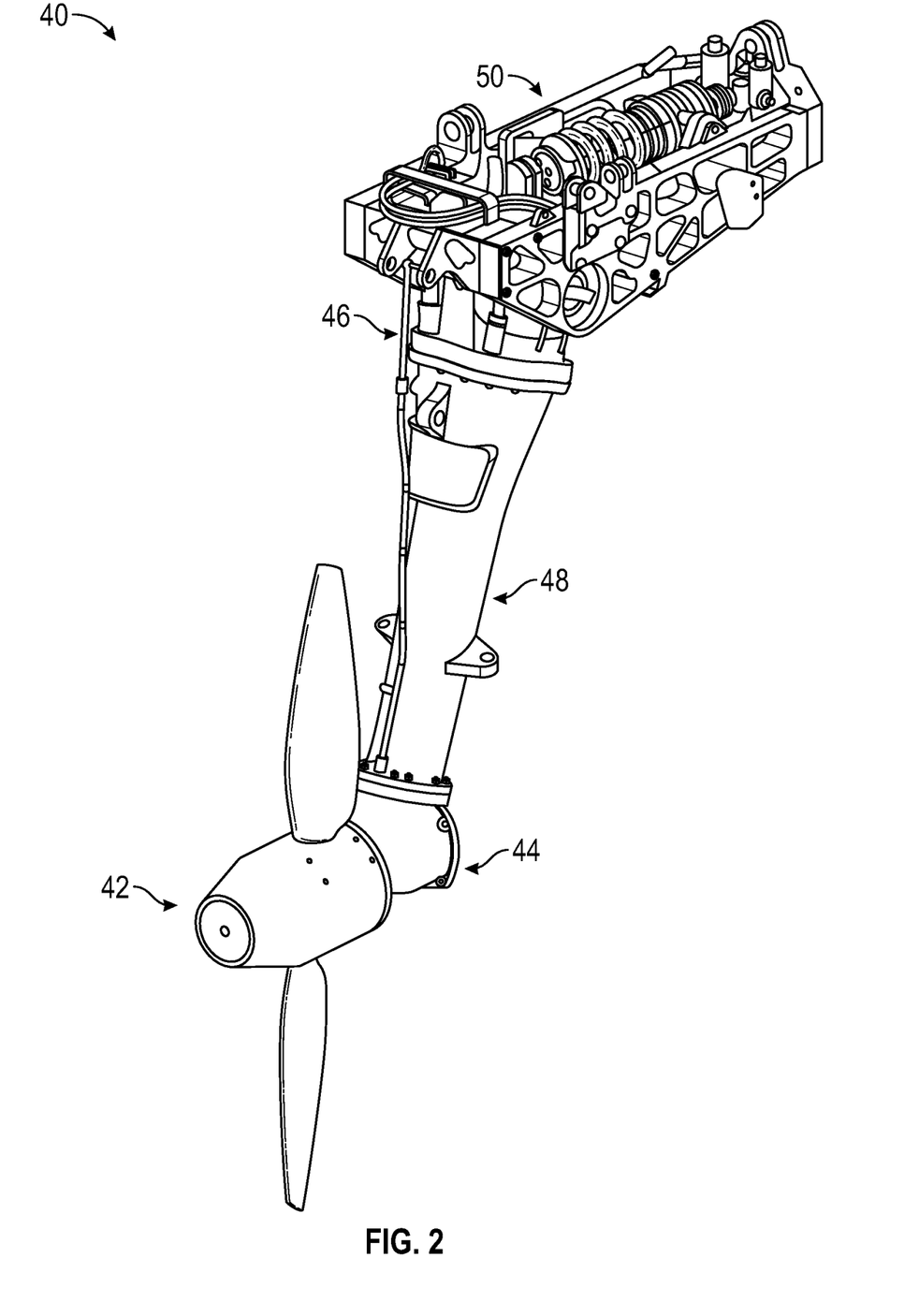
FIG. 2 is a perspective view of ram air turbine (RAT) assembly that may incorporate embodiments of the present disclosure.

Referring now to FIGS. 1 and 2. FIG. 1 shows a perspective view of an aircraft 2 that may incorporate embodiments of the present disclosure. FIG. 2 shows a perspective view of ram air turbine (RAT) assembly 40 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38.

Aircraft 2 includes a ram air turbine (RAT) assembly 40 mounted within fuselage 4 or nose portion 6. When additional electrical and/or hydraulic power is required, a compartment door 54 in the fuselage 4 will open and an actuator 50 will actuate to deploy the RAT assembly 40 into the freestream air. As shown in FIG. 2, the RAT assembly 40 may include a turbine assembly 42, a gearbox assembly 44, a shaft assembly 48, a generator 46, and the actuator 50. As the turbine assembly 42 rotates, the rotational torque is transferred from the turbine assembly 42, through the gearbox assembly 44 to a driveshaft (not shown) in the strut assembly 48, and then to the generator 46. The generator 46 may be an electrical generator, hydraulic pump, or both an electrical generator and a hydraulic pump.

Figure 3:
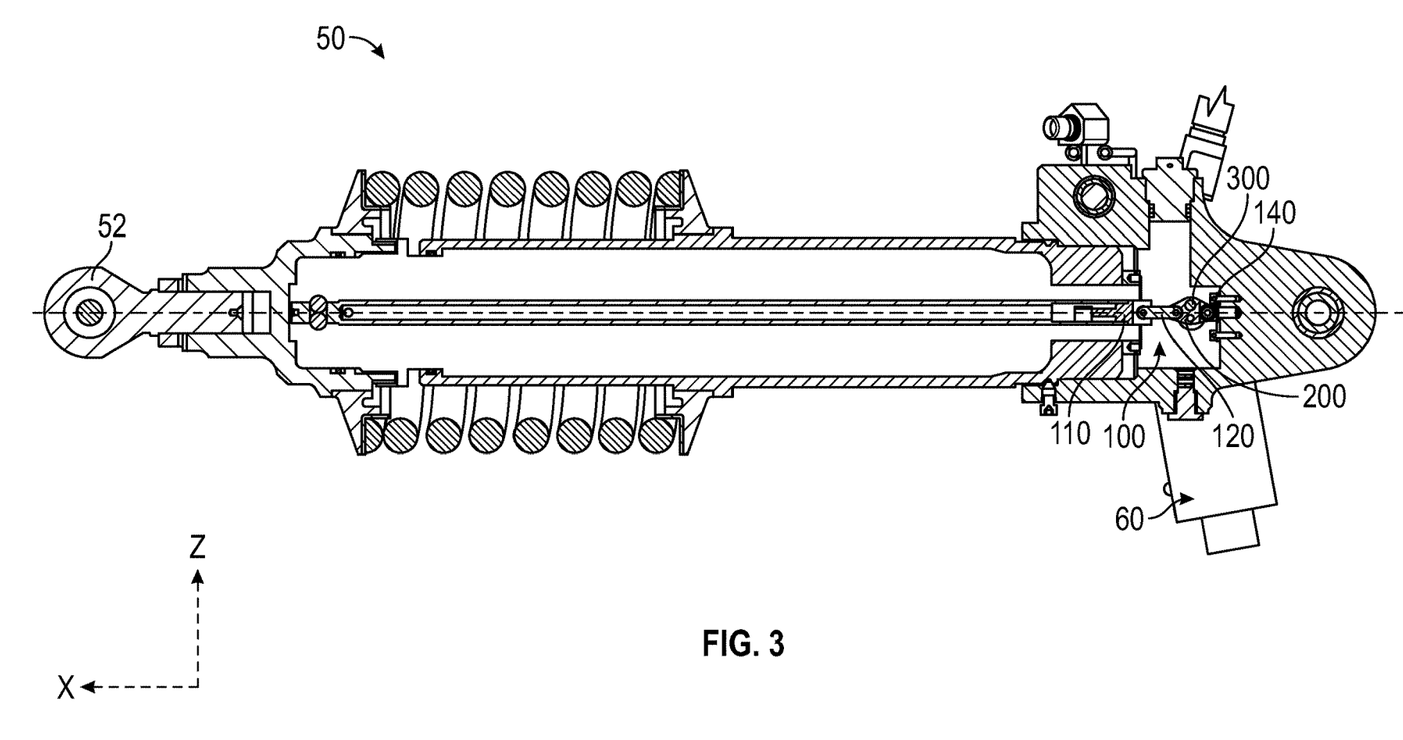
FIG. 3 is a cross-sectional side view of an actuator for use in the RAT assembly of FIG. 2, according to an embodiment of the present disclosure.
Figure 4:
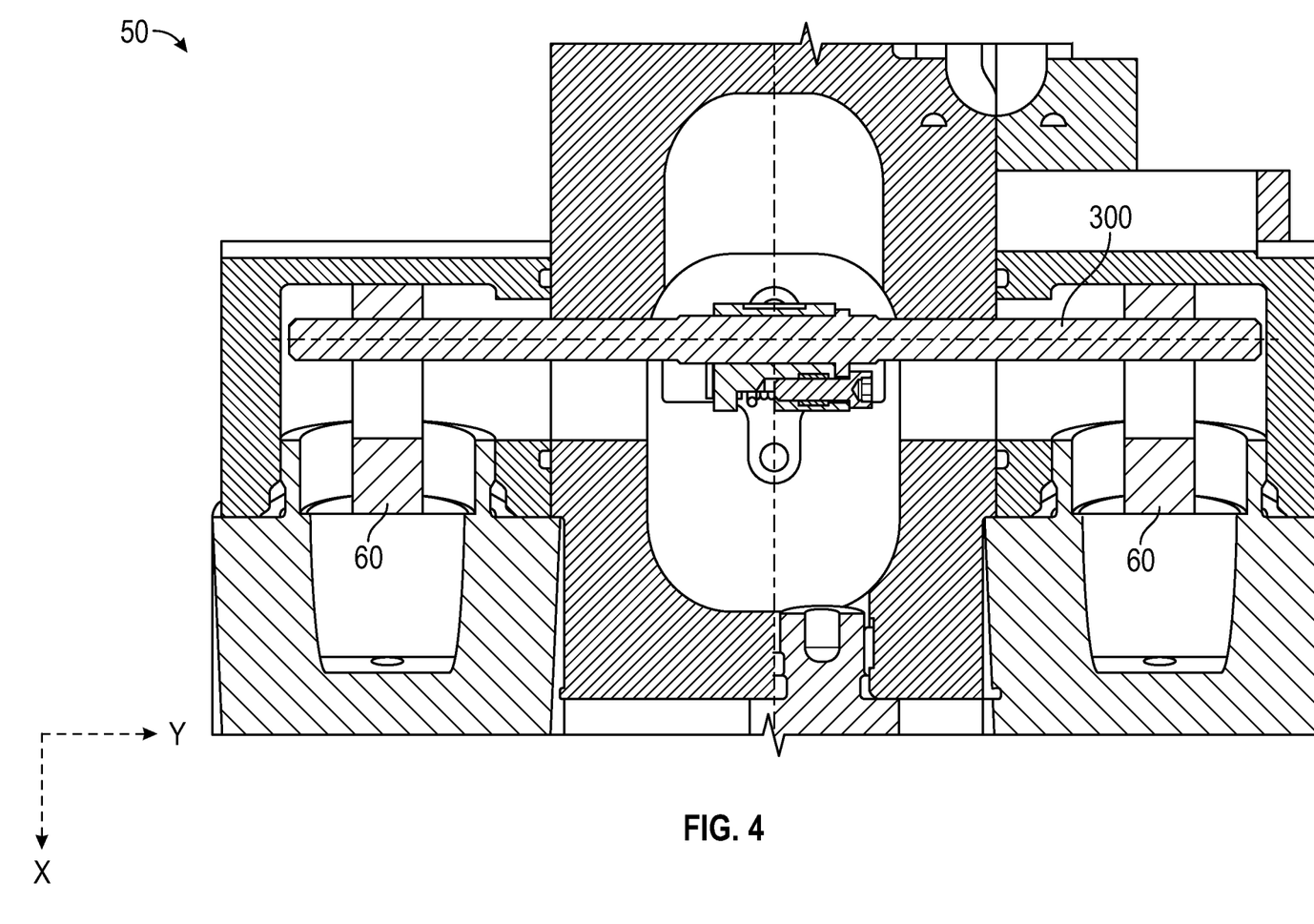
FIG. 4 is an enlarged cross-sectional top view of the actuator of FIG. 3, according to an embodiment of the present disclosure.

Referring now to FIGS. 3 and 4. FIG. 3 shows a cross-sectional side view of an actuator 50 for use in the RAT assembly 40 of FIG. 2, according to an embodiment of the present disclosure. FIG. 4 shows an enlarged cross-sectional top view of the actuator 50 of FIG. 3, according to an embodiment of the present disclosure. In the illustrated embodiment, the actuator 50 includes a toggle mechanism 100, solenoids 60 and a rod end 52. The toggle mechanism 100 may include a lock piston 110, a link 120, a clevis 200, a cross rod 300 and a bracket 140. The toggle mechanism 100 operates as an over center mechanism. The solenoids 60 pull on the cross rod 300 to move the toggle mechanism 100 past its over-center position. Once the toggle mechanism 100 moves past its over-center position, the link 120 shifts and subsequently allows the lock piston 110 to translate in direction X. The lock piston 110 had been originally preloaded to translate in direction X but was previously prevented from translating by the link 120. The motion of the lock piston 110 activates the actuator 50, and thus as the lock piston 110 completes its motion, the actuator 50 begins translating the rod end 52 in direction X. The motion of the rod end will deploy and/or retract the RAT (e.g. RAT assembly 40 as shown in FIG. 2). The force generated by the solenoids 60 imparts a large bending force on the cross rod 300. Further, the preload on the lock piston 110 also imparts a large bending force on the cross rod 300. These forces can bend the cross rod 300 if it is not sufficiently thick.

Figure 5:
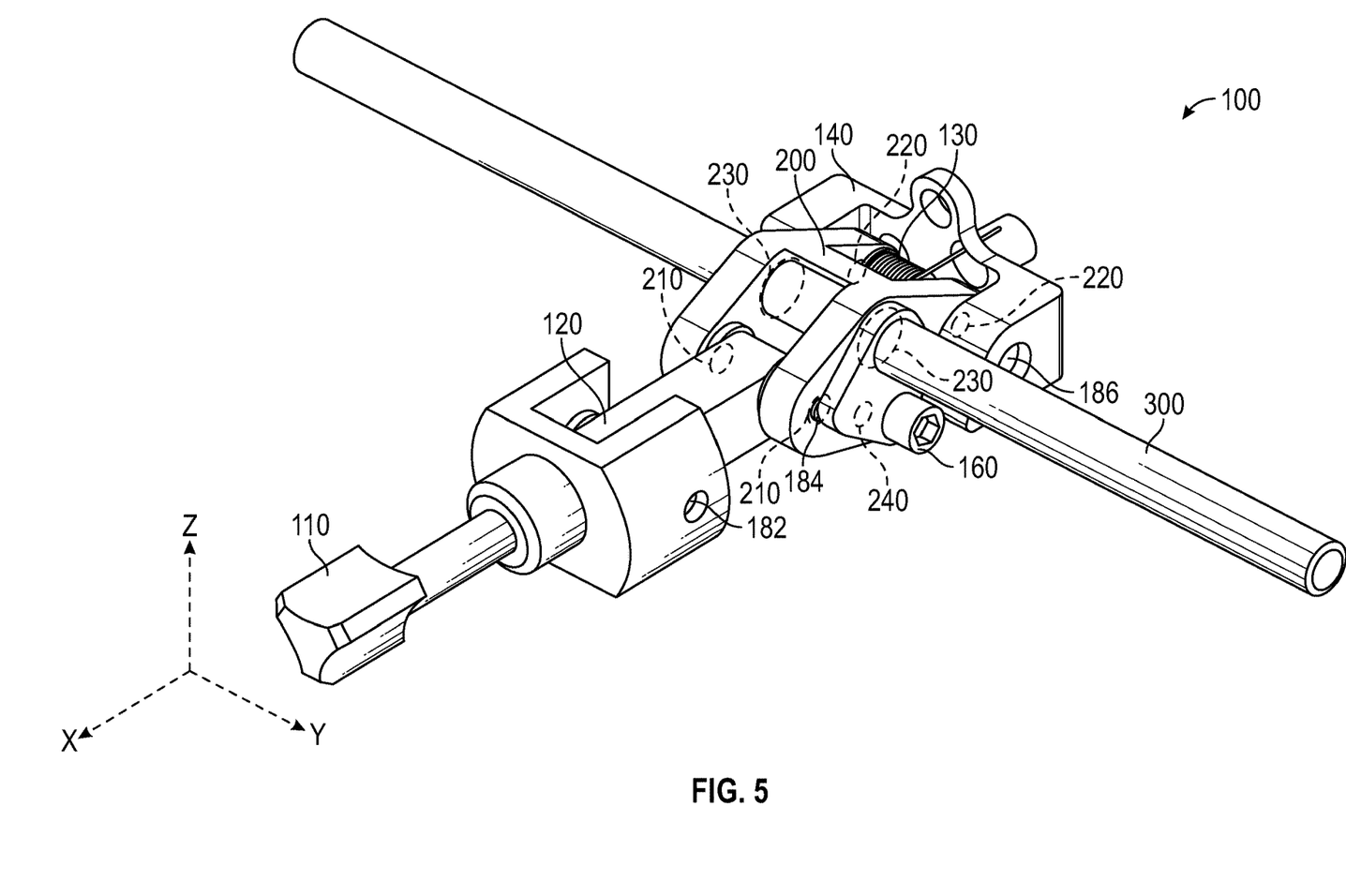
FIG. 5 is a schematic illustration of a toggle mechanism for use in the actuator of FIG. 3, according to an embodiment of the present disclosure.
Figure 7:
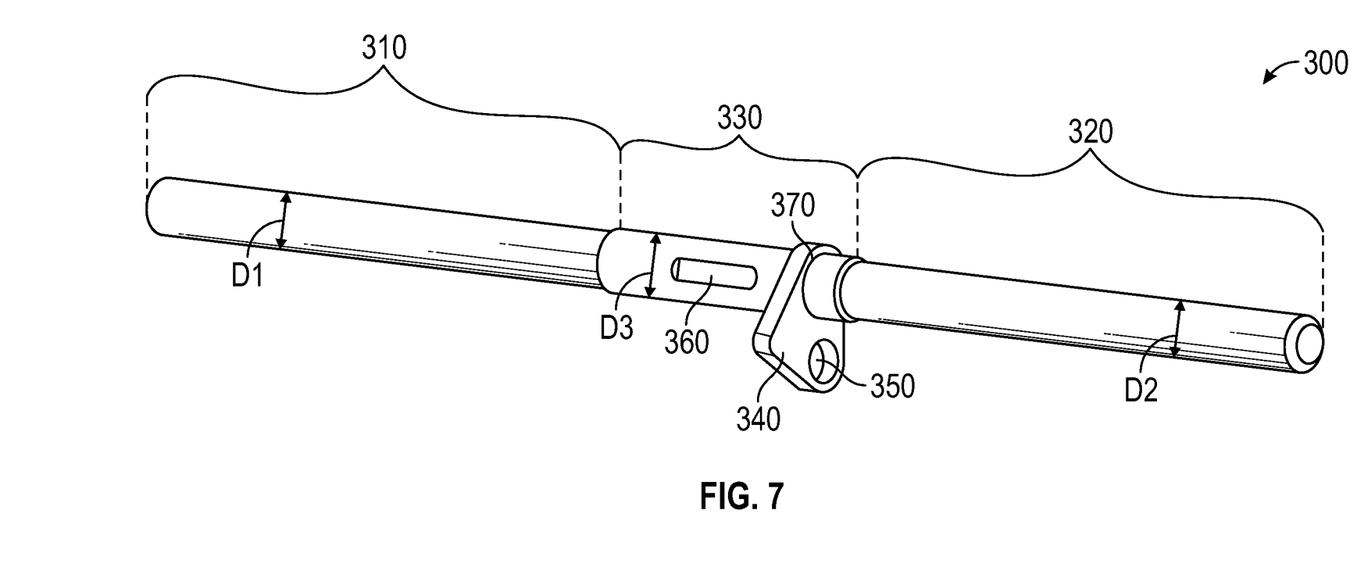
FIG. 7 is a schematic illustration of a cross rod for use in the toggle mechanism of FIG. 5, according to an embodiment of the present disclosure.

Referring now to FIGS. 5 and 7. FIG. 5 shows a schematic illustration of a toggle mechanism 100 for use in the actuator 50 of FIG. 3, according to an embodiment of the present disclosure. FIG. 7 shows a schematic illustration of a cross rod 300 for use in the toggle mechanism 100 of FIG. 5, according to an embodiment of the present disclosure. The toggle mechanism 100 includes a clevis 200 and a cross rod 300 operably connected to the clevis 200. The cross rod 300 having a first section 310, a second section 320, and a midsection 330 between the first section 310 and the second section 320. The first section 310 has a first diameter D1, the second section 320 has a second diameter D2, and the midsection 330 has a third diameter D3. Further, the midsection 330 includes a flange 340. The flange 340 may be formed via machining the midsection 330 of the cross rod 300. Alternatively, the flange 340 may rigidly connected to the midsection 330. In an embodiment, the flange 340 may be rigidly connected to the midsection by a weld at a juncture 370. As shown, the flange 340 also includes a through hole 350. The midsection 330 also includes a clearance notch 360. The clearance notch 360 allows the cross rod 300 to avoid hitting the link 120 when lock piston 110 translates. The clevis 200 includes a first set of parallel pivot holes 210, a second set of parallel pivot holes 220, a set of parallel through holes 230, and a helicoil blind hole 240. The toggle mechanism 100 may also include a bracket 140 operably connected to the clevis 200 at the second set of parallel pivot holes 220, via a biasing mechanism 130. In an embodiment, the biasing mechanism 130 may be a spring.

In the illustrated embodiment, the toggle mechanism 100 also includes a cap screw 160 located in the through hole 350. The cap screw 160 secures the cross rod 300 to the set of parallel through holes 230 of the clevis 200. The cap screw 160 secures the cross rod 300 to the clevis 200 via the helicoil blind hole 240. The cap screw 160 prevents the cross rod 300 from rotating in the clevis 200. If the cross rod 300 had bent due to heavy loads, and then rotated in the clevis 200, the over center position may change for various cross rod 300 rotational positions. In order to prevent the cross rod from bending, various changes were incorporated into the cross rod 300 in FIG. 7 versus alternate cross-rod designs.

Figure 6:
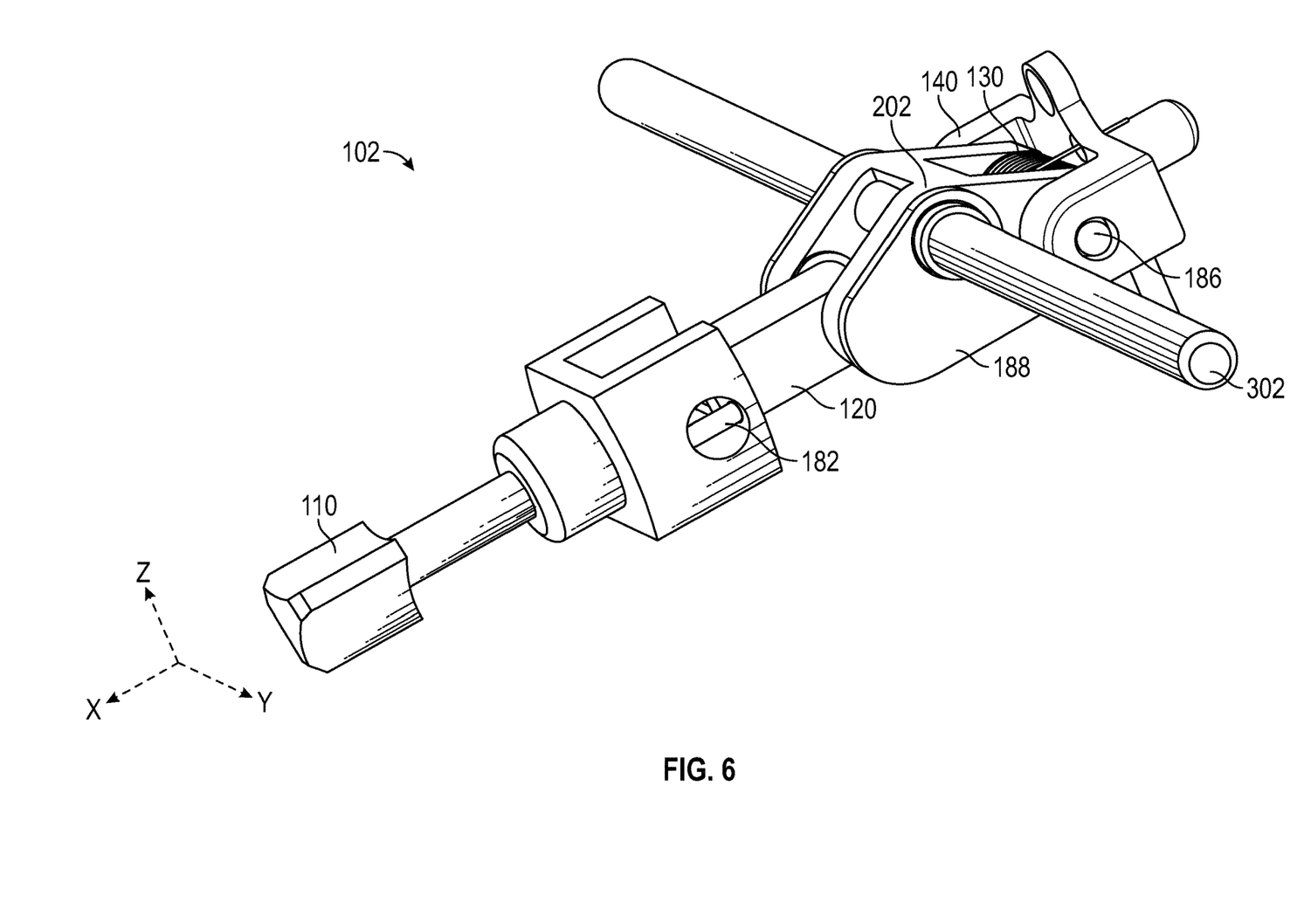
FIG. 6 is a schematic illustration of an alternate toggle mechanism capable of being using in the actuator of FIG. 3.
Figure 8:
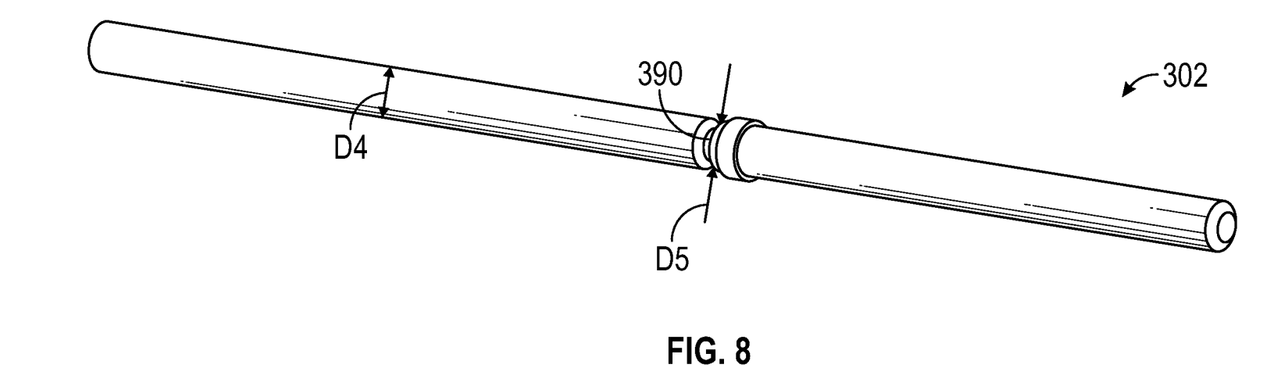
FIG. 8 is a schematic illustration of an alternate cross rod for use in the alternate toggle mechanism of FIG. 6.

Referring now to also FIGS. 6 and 8, in addition to FIGS. 5 and 7. FIG. 6 shows a schematic illustration of an alternate toggle mechanism 102 capable of being using in the actuator 50 of FIG. 3. FIG. 8 shows a schematic illustration of an alternate cross rod 302 for use in the alternate toggle mechanism 102 of FIG. 6. In comparing cross rod 300 in FIG. 7 to the alternate cross rod 302 in FIG. 8, it may be seen that the diameter (D1, D2, and D3) of cross rod 300 is greater than the diameter D4 of the alternate cross rod 302. Having a larger diameter allows cross rod 300 to withstand larger bending forces. Further, the third diameter D3 may be larger than at least one of the first diameter D1 and the second diameter D2. Having a larger diameter in the middle allows the cross rod 300 to be stronger where it is needed most. In contrast, the alternate cross rod 302 includes a scallop 390 near the center of the alternate cross rod 302, which results in a smaller diameter D5. The smaller diameter D5 creates a weak point near the center of the alternate cross rod 302, where the bending forces are often elevated.

Further difference in the cross rod 300 over the alternate cross rod 302 could be seen with the addition of the flange 340 on the cross rod 300. The flange 340 allows the pivot pin 184 connecting the link 120 to the clevis 200 to remain in the first set of parallel pivot holes 210 of the clevis 200. The pivot pin 184 may be pressed into one blind hold of the first set of parallel pivot holes 210 and then the flange 340 will cover up the pivot pin 184 on the other hole. As seen in FIG. 6, the alternate toggle mechanism 102 required a separate piece, called a retainer 188, to keep the pivot pin 184 in its place.

Figure 9:
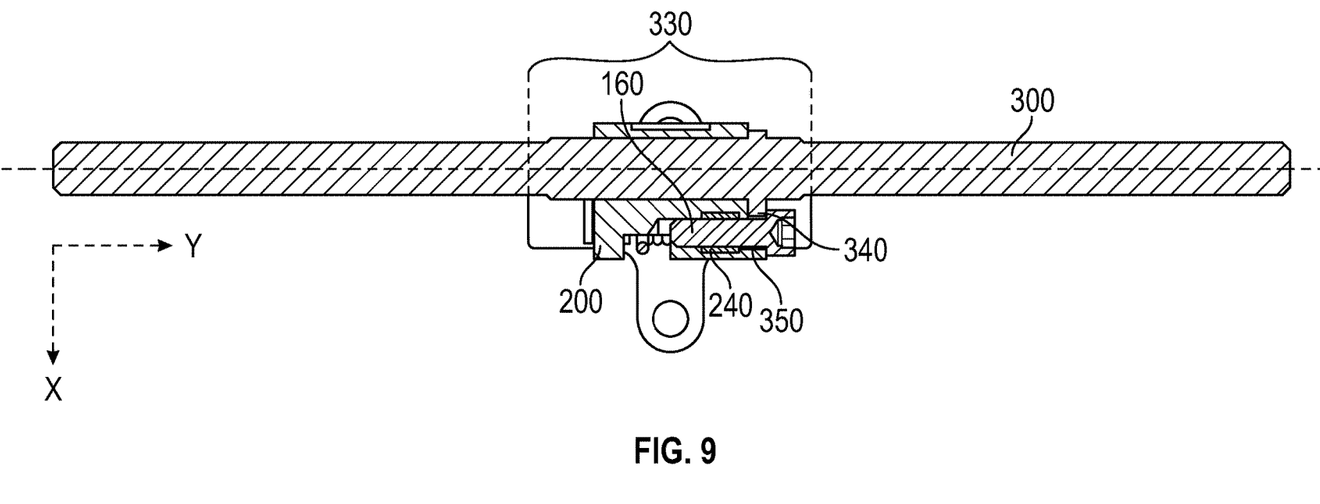
FIG. 9 is a schematic cross-sectional illustration of a cross rod and clevis assembly for use in the toggle mechanism of FIG. 5, according to an embodiment of the present disclosure.
Figure 10:
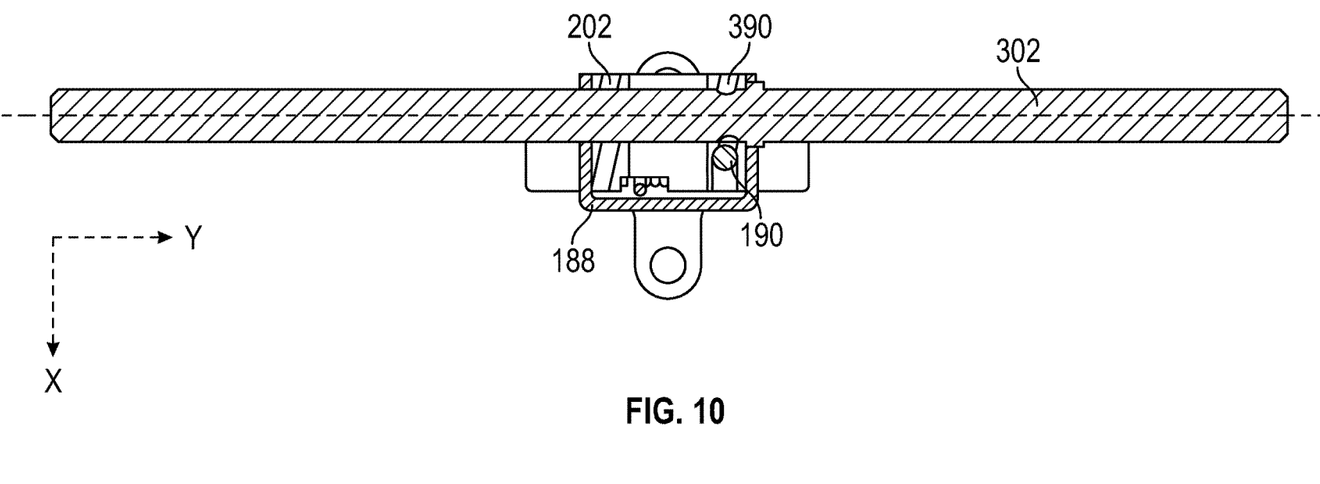
FIG. 10 is a schematic cross-sectional illustration of an alternate cross rod and alternate clevis assembly for use in the toggle mechanism of FIG. 6.

Referring now to FIGS. 9 and 10. FIG. 9 shows a schematic cross-sectional illustration of a cross rod 300 and clevis 200 assembly for use in the toggle mechanism 100 of FIG. 5, according to an embodiment of the present disclosure. FIG. 10 shows a schematic cross-sectional illustration of an alternate cross rod 302 and alternate clevis 202 assembly for use in the alternate toggle mechanism 102 of FIG. 6. In order to reduce movement in direction Y, the cross rod 300 is secured to the clevis 200 via the cap screw 160, such that the flange 340 is abutting the clevis 200, as shown. The cap screw 160 is located in the through hole 350 of the flange 340 and screws into the clevis 200 at the helicoil blind hole 240. As shown in FIG. 10, the thickness of the alternate cross rod 302 is reduced at the scallop 390, in order to accommodate a set screw 190, which reduces movement in direction Y. The cap screw 160, the flange 340 and the helicoil blind hole 240 in FIG. 9 eliminates the need to reduce the thickness of the cross rod 200 in the midsection 330, unlike the alternate cross rod 302. Advantageously, a thicker diameter at the midsection 330 helps make the cross rod 300 stronger and more resistant to bending and/or breaking than the alternate cross rod 302. Also advantageously, as mentioned above, the flange 340 of the cross rod 300 eliminates the need for the retainer 188, which was required by the alternate cross rod 302 and alternate clevis 202 assembly of FIG. 10. The elimination of the retainer 188 and the set screw 190 reduces part count and simplifies assembly.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A toggle mechanism for a ram air turbine actuator comprising:
   a clevis;
   a cross rod operably connected to the clevis, the cross rod having a first section, a second section, and a midsection between the first section and the second section, the midsection includes a flange having a through hole; and
   a cap screw located in the through hole, the cap screw securing the cross rod to the clevis.

2. The toggle mechanism of claim 1, wherein:
   the first section has a first diameter, the second section has a second diameter, and the midsection has a third diameter, the third diameter being larger than at least one of the first diameter and the second diameter.

3. The toggle mechanism of claim 1, wherein:
   the midsection includes a clearance notch.

4. The toggle mechanism of claim 1, wherein:
   the clevis includes a first set of parallel pivot holes, a second set of parallel pivot holes, a set of parallel through holes, and a helicoil blind hole.

5. The toggle mechanism of claim 4, further comprising:
   a lock piston operably connected to the clevis through a link, the link being operably connected to the first set of parallel pivot holes via a pivot pin, wherein the pivot pin is secured in the first set of parallel pivot holes by the flange.

6. The toggle mechanism of claim 5, further comprising:
   a bracket operably connected to the clevis at the second set of parallel pivot holes, via a biasing mechanism.

7. The toggle mechanism of claim 5, wherein:
   the cap screw secures the cross rod to the clevis via the helicoil blind hole.

8. A method of manufacturing a toggle mechanism for a ram air turbine actuator comprising:
   forming a cross rod having a first section, a second section, and a midsection between the first section and the second section;
   forming a flange at the midsection, the flange having a through hole;
   inserting the cross rod into a set of parallel through holes within a clevis, such that the flange is abutting a side of the clevis; and
   installing a cap screw in the through hole of the flange to secure the cross rod to the clevis.

9. The method of claim 8, wherein:
the clevis includes a first set of parallel pivot holes, a second set of parallel pivot holes, and a helicoil blind hole.

10. The method of claim 9, further comprising:
operably connecting a lock piston to the clevis through a link, the link being operably connected to the first set of parallel pivot holes via a pivot pin, wherein the pivot pin is secured in the first set of parallel pivot holes by the flange.

11. The method of claim 9, further comprising:
operably connecting a bracket to the clevis at the second set of parallel pivot holes, via a biasing mechanism.

12. The method of claim 9, wherein:
the cap screw secures the cross rod to the clevis via the helicoil blind hole.

13. The toggle mechanism of claim 8, wherein:
the midsection includes a clearance notch.

14. The toggle mechanism of claim 8, further comprising:
forming the flange via machining the midsection of the cross rod.

\* \* \* \* \*